(12) United States Patent
Zheng et al.

(10) Patent No.: US 10,656,335 B2
(45) Date of Patent: May 19, 2020

(54) CLEAVING FIBERS OF DIFFERING COMPOSITION

(71) Applicant: INTERNATIONAL BUSINESS MACHINES CORPORATION, Armonk, NY (US)

(72) Inventors: Jiayu Zheng, Shenzhen (CN); Licen Mu, Shenzhen (CN); Michael Benosa Monjardin, Guangdong (CN); Tao Song, Shenzhen (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/038,755

(22) Filed: Jul. 18, 2018

(65) Prior Publication Data
US 2020/0026004 A1 Jan. 23, 2020

(51) Int. Cl.
*B26D 1/45* (2006.01)
*B26D 5/16* (2006.01)
(Continued)

(52) U.S. Cl.
CPC ............... *G02B 6/25* (2013.01); *B26D 1/455* (2013.01); *B26D 5/086* (2013.01); *B26D 5/16* (2013.01); *B26F 3/002* (2013.01); *G02B 6/2553* (2013.01)

(58) Field of Classification Search
CPC .......... B26D 5/16; G02B 6/25; G02B 6/2553; B26F 3/002
See application file for complete search history.

(56) References Cited

U.S. PATENT DOCUMENTS

| 3,866,449 A | 2/1975 | Wakabayashi et al. |
| 3,880,028 A * | 4/1975 | Frederick, Jr. ......... B23Q 15/12 83/880 |

(Continued)

FOREIGN PATENT DOCUMENTS

| CN | 101476899 A | 7/2009 |
| CN | 104880267 A | 9/2015 |

(Continued)

OTHER PUBLICATIONS

Internet advertisement: "http://nyfors.com/products/automatic-fiber-cleaving", Nyfors Teknologi AB.

*Primary Examiner* — Sean M Michalski
(74) *Attorney, Agent, or Firm* — Gregory M. Nordstrom

(57) ABSTRACT

A method for cleaving a fiber comprises rotating an actuator to apply a positioning force to a blade in a scoring assembly. The positioning force produces a score in the surface of a fiber, and the method further comprise applying a cleaving force to the fiber to cleave the fiber. The method can further include measuring the magnitude of the positioning force and rotating the actuator until the magnitude corresponds to a pre-determined magnitude. A cleaver comprises a scoring assembly, drive assembly, and a cleaving assembly. The scoring assembly includes a holder having one or more blades, and an actuator. The cleaving assembly secures a fiber in the scoring assembly. The drive assembly rotates the actuator to position one or more blades to score the surface of the fiber. The cleaving assembly applies a cleaving force to the fiber to cleave the fiber at the location of the score.

16 Claims, 11 Drawing Sheets

(51) Int. Cl.
*G02B 6/25* (2006.01)
*B26D 5/08* (2006.01)
*B26F 3/00* (2006.01)
*G02B 6/255* (2006.01)

(56) References Cited

U.S. PATENT DOCUMENTS

| | | | |
|---|---|---|---|
| 3,934,773 A | 1/1976 | Chinnock et al. | |
| 4,154,385 A * | 5/1979 | Lewis | B26F 3/002 225/2 |
| 4,203,539 A | 5/1980 | Miller | |
| 4,216,004 A * | 8/1980 | Brehm | G02B 6/25 225/2 |
| 4,463,886 A * | 8/1984 | Thornton | G02B 6/25 225/2 |
| 4,621,754 A | 11/1986 | Long et al. | |
| 4,667,862 A | 5/1987 | Millar et al. | |
| 4,771,665 A | 9/1988 | Van Doom et al. | |
| 4,785,701 A | 11/1988 | ten Berge et al. | |
| 5,024,363 A * | 6/1991 | Suda | G02B 6/25 225/2 |
| 5,108,021 A * | 4/1992 | Vines | G02B 6/25 225/100 |
| 5,323,324 A * | 6/1994 | Fredriksson | G05B 19/0421 700/130 |
| 5,883,356 A * | 3/1999 | Bauer | B23K 26/032 219/121.62 |
| 5,974,921 A | 11/1999 | Ichikawa et al. | |
| 6,152,007 A * | 11/2000 | Sato | B26D 1/0006 83/202 |
| 6,338,003 B1 * | 1/2002 | Kamiguchi | G05B 19/409 700/169 |
| 7,684,935 B2 | 3/2010 | Voigtländer et al. | |
| 8,998,682 B2 | 4/2015 | Christopher et al. | |
| 9,377,583 B2 | 6/2016 | Giaretta et al. | |
| 9,746,610 B2 | 8/2017 | Kurosaka et al. | |
| 9,885,833 B2 | 2/2018 | Vallance et al. | |
| 2005/0109177 A1 * | 5/2005 | Wiley | G02B 6/25 83/13 |
| 2006/0042432 A1 * | 3/2006 | Bottcher | G02B 6/25 83/13 |
| 2006/0201982 A1 * | 9/2006 | Yazaki | G02B 6/25 225/1 |
| 2006/0232403 A1 * | 10/2006 | Dang | C03B 17/064 340/550 |
| 2008/0187273 A1 * | 8/2008 | Clark | G02B 6/245 385/96 |
| 2010/0127034 A1 * | 5/2010 | Bouchard | G02B 6/25 225/2 |
| 2010/0154614 A1 * | 6/2010 | Liao | B26B 7/086 83/880 |
| 2010/0163593 A1 * | 7/2010 | Song | G02B 6/25 225/96 |
| 2010/0209055 A1 * | 8/2010 | Heidler | G02B 6/2553 385/95 |
| 2010/0239214 A1 * | 9/2010 | Kossat | G02B 6/25 385/96 |
| 2011/0052135 A1 * | 3/2011 | Wiley | G02B 6/25 385/137 |
| 2011/0204117 A1 | 8/2011 | Barnes et al. | |
| 2011/0247473 A1 * | 10/2011 | Beach | G02B 6/25 83/862 |
| 2012/0125166 A1 * | 5/2012 | Hallett | B26D 1/305 83/13 |
| 2014/0083273 A1 * | 3/2014 | Vallance | B26D 3/08 83/880 |
| 2014/0116218 A1 * | 5/2014 | Kwarta | B26D 1/245 83/425.4 |
| 2016/0185647 A1 * | 6/2016 | Vogt | C03B 33/10 428/43 |
| 2016/0187583 A1 | 6/2016 | Vallance et al. | |
| 2016/0303892 A1 * | 10/2016 | Killian | B44B 3/009 |
| 2017/0285266 A1 | 10/2017 | Wu | |

FOREIGN PATENT DOCUMENTS

| | | |
|---|---|---|
| EP | 2974833 A1 | 1/2016 |
| KR | 1020080111234 A | 12/2008 |

* cited by examiner

CLEAVING FIBERS OF DIFFERING COMPOSITION

BACKGROUND

The present disclosure relates to cleaving a fiber, and more specifically, to cleaving fibers having various material compositions and hardness.

SUMMARY

According to embodiments of the present disclosure (hereinafter, "embodiments"), a method for cleaving a fiber comprises rotating a blade actuator, included in a scoring assembly, to apply a positioning force to a scoring blade included among at least one scoring blade of the scoring assembly. Applying the positioning force to the scoring blade produces a score in a surface of a fiber positioned within a scoring assembly. The method further comprises applying a cleaving force to the fiber to cleave the fiber at a location of the fiber surface corresponding to the score.

In embodiments, the method can further include measuring the magnitude of the positioning force applied to the scoring blade and continuing to rotate the blade actuator until the magnitude of the positioning force corresponds to a pre-determined magnitude. The pre-determined magnitude can correspond, in embodiments, to a depth of the score in the surface of the fiber. In some embodiments, the scoring assembly has multiple scoring blades and the method further comprises rotating the blade actuator to apply an equivalent positioning force to each of the scoring blades. In alternative embodiments, the scoring assembly has multiple scoring blades and the method further comprises rotating the blade actuator to apply a different positioning force to each of two or more of the scoring blades.

In embodiments, the magnitude of the cleaving force can be measured, and the cleaving force increased until the cleaving force equals a cleaving strength of the fiber. In embodiments, applying the cleaving force can comprise applying a tension to the fiber.

A cleaver can embody aspects of the disclosure. In an embodiment, a cleaver can comprise a scoring assembly, a drive assembly, and a fiber cleaving assembly. The scoring assembly can include a blade holder securing one or more scoring blades within the scoring assembly, and a blade actuator. The fiber cleaving assembly can be configured to secure a fiber, along a longitudinal axis of the fiber, within the scoring assembly. The drive assembly can rotate the blade actuator to position a scoring blade at an axial distance from the fiber to produce a score in the surface of the fiber. The fiber cleaving can apply a cleaving force to the segment of the fiber to cleave the fiber at the location of the score on the surface of the fiber.

In some embodiments, the blade actuator rotates around the blade holder. Rotating the blade actuator, in some embodiments, to position a scoring blade applies a positioning force to the scoring blade to produce the score in the fiber surface. In some embodiments the blade actuator has a raised surface and rotating the blade actuator places a scoring blade in contact with the raised surface to produce the positioning force. A raised surface, in an embodiment, can have a sloped shape, and the positioning force applied by the blade actuator to a scoring blade can correspond to a position, on the sloped shape of the raised surface, at which rotating the blade actuator places the raised surface in contact with the scoring blade.

In an embodiment, a blade actuator can apply an equivalent positioning force to each of a plurality of scoring blades. In an alternative embodiment, a blade actuator can apply a different positioning force to each of two or more scoring blades. An embodiment can include a sensor to measure the magnitude of a positioning force, an interface to communicate the magnitude, and an output device to receive the magnitude from the interface. In some embodiments, the cleaver includes a sensor to measure the magnitude of the cleaving force, and the cleaver increases the cleaving force until the measured magnitude of the cleaving force corresponds to a cleaving strength of the fiber.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
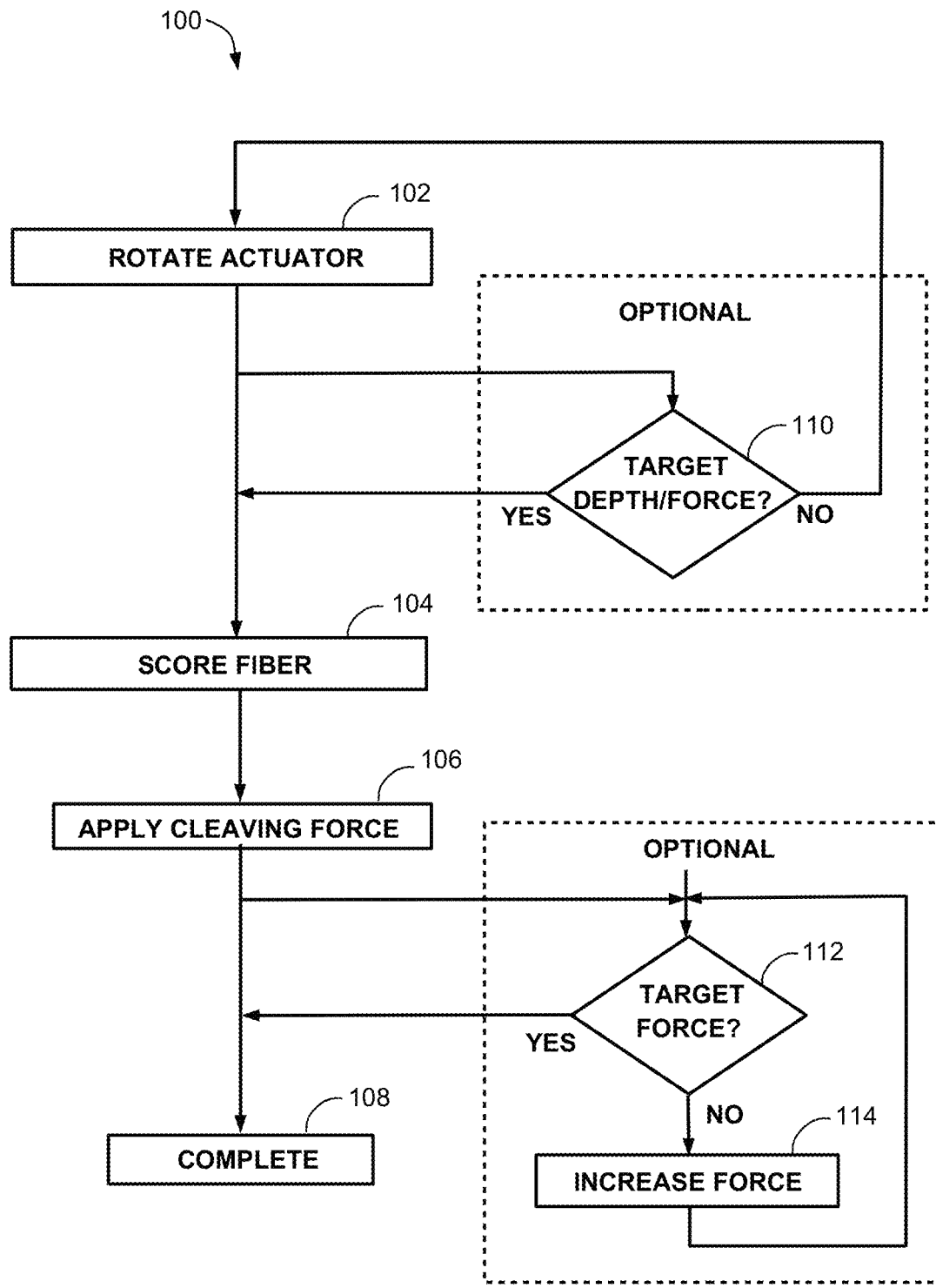
FIG. 1 is a flowchart illustrating a method of cleaving a fiber, according to aspects of the disclosure.

While the disclosure is amenable to various modifications and alternative forms, specifics thereof have been shown by way of example in the drawings and will be described in detail. It should be understood, however, that the intention is not to limit embodiments of the disclosure to the particular embodiments described. On the contrary, the intention is to cover all modifications, equivalents, and alternatives falling within the spirit and scope of the disclosure.

DETAILED DESCRIPTION

Aspects of the present disclosure (hereinafter, "the disclosure") relate to cleaving (e.g., cutting or breaking) a fiber.

More particular aspects relate to methods and systems to cleave an optical fiber along a one or more scores produced in the surface of the fiber. While the present disclosure is not necessarily limited to such applications, various aspects of the disclosure may be appreciated through a discussion of various examples using this context.

Communications systems can employ fiber optic technologies got data transmission. As data transmission rates and throughput change (e.g., increase), or vary, for particular communications systems, or applications, it can be necessary to develop and/or apply different fiber technologies, and/or compositions, to meet the requirements of such systems or applications. High capacity, and/or long-distance transmission requirements—such as can apply to Dense Wavelength Division Multiplexing (DWDM) signal transmission systems—can, for example, employ optical fiber amplifiers to meet such requirements.

In fiber optic systems, "gain fibers" can be utilized to improve optical signal quality in amplifying fiber optic transmissions. Gain, and/or transmission, fibers can, for example, be comprised of differing concentrations of silica, and/or can comprise other materials in addition to, or in lieu of, silica glass materials. For example, optical fibers can include, or comprise, materials such as polymers (e.g., plastics), and/or fluorozirconate, fluoroaluminate, and chalcodenide glasses, in addition to, or in lieu of, silica glass. Such varying composition fibers are referred to, herein, as "multi-composition" fibers, to distinguish from conventional, high-silica, or pure-silica, optical fiber.

Gain fibers can be employed in fiber optic systems by joining, or "coupling", one or more gain fibers to optical signal input and/or out output signal fibers. For example, a 'butt joint" can be formed (e.g., by welding or coaxial abutment) to join a gain fiber to an input and/or output signal fiber. However, the performance (e.g., signal loss, or attenuation) of the resulting combination of fibers can be affected by the quality of the cross-sectional boundaries of the fibers at the point they are coupled (e.g., abutted). Gain fibers can be the same composition or, alternatively, can be a differing composition, from input and/or output fibers to which they are coupled, which can also require forming high-quality cross-sectional boundaries, or cross-sectional "faces", in an end of each of the coupled fibers.

As used herein, "cross-sectional face" refers to a cross-sectional boundary terminating a segment of a fiber. Also, as used herein, "surface" of a fiber refers to the circumferential surface of a fiber forming the outer boundary of a cross-section of the fiber. Forming a cross-sectional face at an end of a fiber can involve "cleaving" (e.g., cutting, or breaking) a segment of the fiber in a plane intersecting the surface of the fiber. In embodiments of the disclosure (hereinafter, "embodiments", or "an embodiment"), such cross-sectional faces can be at angles perpendicular to the surface of a fiber or can be at alternative angles bisecting the surface of a fiber. Cleaving a fiber can produce a cross-sectional face in one or both of the two segments of a fiber created by cleaving the segment. As used herein, "quality" of a fiber cross-sectional face refers to the degree to which the cross-sectional face affects (e.g., degrades and/or improves) desirable properties of the fiber at that cross-sectional face, such as optical signal transmission or properties that affect the ability to couple the fiber to other fibers or components of a system. Methods of cleaving a fiber to produce a high-quality fiber cross-sectional face in a fiber can be advantageous to coupling fibers, such as coupling multi-composition fibers using fiber-to-fiber joints (or, abutments) in systems that employ these fiber compositions.

While the disclosure illustrates aspects of the invention using the example of optical fibers, it would be apparent to one of ordinary skill in the art that the invention is not limited to such fibers. The invention can be utilized with other types or compositions of fibers, and/or fibers used in applications other than optical signal transmission (e.g., carbon fibers). Accordingly, as used herein, "fiber" refers to any fiber, of any composition and/or application, in which cleaving the fiber can be employed to produce a cross-sectional face at an end of the fiber. Additionally, as used herein, in reference to a fiber, "longitudinal" refers to the direction of a length of the fiber, or a segment of a fiber. Correspondingly, a fiber can have a "longitudinal axis" parallel to the direction of a segment of the fiber. In embodiments, a longitudinal axis can be, but is not necessarily required to be, coincident with an axis at the cross-sectional center of the fiber. Further, as used herein, in reference to a fiber, "circumference" refers to the circumference of a cross-section of a fiber (or, elements of the fiber, such as a light, or other signal, transmitting core of the fiber, and/or a cladding layer surrounding such a core), and "fiber surface" refers to a circumferential surface of the fiber at the outer boundary of a cross-section of the fiber (or, element thereof).

Methods of, and/or systems for, cleaving a fiber can comprise making a cut, or "score", in the surface of the fiber and then applying a cleaving force (e.g., bending force, and/or tensional force) to a segment of the fiber to cause the fiber to cleave at the location of the score. Depth and/or width, and other geometries of the score (e.g., fraction of the fiber circumference comprising the score) can affect the quality of the resulting cross-sectional face of the fiber.

Quality of a cross-sectional face of a fiber formed by cleaving a fiber can depend on the method of cleaving the fiber. For example, the method of cleaving a fiber can involve orientation of a scoring edge (e.g., a knife blade), and/or number of scoring edges, to score a fiber; material of a scoring edge to score a fiber; and/or, orientation of force applied to a fiber to cause it to cleave. Factors such as these examples can determine, for example, the geometry (e.g., depth, width, fraction of the fiber circumference) of a score of the fiber circumferential surface which can, in turn, determine quality of a resulting cross-sectional face of a fiber.

Additionally, the composition of the fiber material, and/or properties thereof, can affect the quality of the resulting fiber cross section. For example, the hardness of a fiber composition (e.g., degree to which a material is brittle) can affect the quality of a cleaved fiber cross section. High-silica composition fibers can have, for example, a high hardness, while fibers of other compositions (e.g., multi-composition fibers) can have lower hardness. A method of cleaving that can produce a high-quality cross-section of a hard fiber can produce a lower quality cross-section of a lower hardness fiber. Accordingly, a method that can, for example, vary the geometry (e.g., depth, width, and/or circumferential fraction) of a score of a fiber surface, and/or can vary the magnitude of a cleaving force (e.g., a tension) can produce a high quality cross-sectional face. Controlling the force of a blade applied to score the surface of the fiber, and/or a cleaving force, such as a tension, can produce a high quality cross-sectional face. Controlling the force of a blade and/or a cleaving force can include measuring the force, and linearly increasing (or, alternatively, decreasing) the force to achieve a scoring and/or cleaving force corresponding to a high quality cross-sectional face of a fiber of a particular type, composition, and/or application.

In FIG. 1, method 100 illustrates an example method for cleaving a fiber. For purposes of illustrating example method 100, but not intended to limit embodiments of the disclosure, the method is described using an example embodiment comprising a "cleaver". As used herein, "cleaver" refers to any form of system or apparatus configured to cleave a fiber, according to aspects of the disclosure. At 102 of method 100, the cleaver rotating an actuator positions one or more scoring blades, included in the cleaver, relative to a fiber positioned within the cleaver.

In embodiments, positioning a fiber in a cleaver can include placing a segment of the fiber in the cleaver along a longitudinal axis of the fiber. Positioning a fiber in a cleaver can comprise inserting the fiber (e.g., along a longitudinal axis of the fiber) into an end of the cleaver or, alternatively, can comprise securing the cleaver around a segment of the fiber (e.g., by opening a cleaver, placing a segment of the fiber within it, and closing the cleaver around the fiber). Positioning a fiber in a cleaver, in an embodiment, can include securing the segment of the fiber within the cleaver such that a cleaving force can be applied to the segment. However, this is not intended to limit embodiments and it would be apparent to one of ordinary skill in the art that positioning a fiber in a cleaver can comprise a variety of means to position a segment of a fiber within a cleaver, and/or to position a cleaver around a segment of a fiber, can comprise a variety of alternative geometries of the fiber within the cleaver.

In embodiments, positioning blades of a cleaver can comprise using an actuator to move the blades toward a longitudinal axis of a fiber in the cleaver. For example, in embodiments, blades of the cleaver can be movable, or adjustable, such as to position the blades from an initial position to a "scoring position". An initial position can be, for example, a position of a blade to facilitate placing a fiber in the cleaver. A scoring position can be, for example, a position of a blade to cut, or "score", the surface of the fiber. A scoring position can be, for example, a position of a blade at a decreased radial distance of the blade from the surface and/or, a longitudinal axis of the fiber. A scoring position of a blade can correspond to a particular "scoring" force, applied by the blade, to the surface of the fiber.

In embodiments, a cleaver can include a "scoring assembly", which can comprise one or more blades, each blade can include a scoring edge. Embodiments can direct a scoring edge of the blades radially toward the "center axis" (i.e., the longitudinal axis located at the cross-sectional center) of the fiber, and the blades can be positioned, for example, circumferentially around, and/or at a radial distance from, the center axis or, alternatively, the surface, of the fiber. Embodiments can locate blades of a scoring assembly relative radially to the fiber surface, according to the type, and/or composition, for example, of the fiber and/or a particular desired geometry of scores in the surface of the fiber and/or cross-sectional face produced by cleaving the fiber. In an embodiment, an actuator can be configured to rotate around (or, alternatively, within) the scoring assembly.

Embodiments can locate blades within a scoring assembly at particular angular distances, relative to each other, around the fiber circumference, and the angular distances can be based, for example, on the number of blades included in a scoring assembly. In another example, the angular distances can be based on the type and/or composition of the fiber, and/or a particular desired geometry of scores in the surface of the fiber and/or cross-sectional face produced by cleaving the fiber. To illustrate, an example embodiment of a scoring assembly can comprise three blades, and each blade can have a respective scoring edge oriented toward a longitudinal axis of the fiber (e.g., directed toward the fiber surface). In the example (but not intending to limit embodiments), the blades can be positioned equally at 120-degree rotational angles around the circumference of the fiber.

Continuing with method 100, at 102, in embodiments rotating an actuator can position one or more blades of the cleaver radially relative to the surface of the fiber. For example, rotating an actuator can decrease the radial distance of one or more blades from the surface of the fiber. Additionally, or alternatively, at 102 rotating an actuator, in an embodiment, can increase the force of a blade applied to the surface of the fiber.

At 104, in response to, at 102, rotating the actuator to position the blade(s), the cleaver applies a scoring force to the blades to produce a score (hereinafter, "scoring") in the fiber surface. In embodiments, a score in the surface of a fiber can comprise a particular fraction of the circumference of the fiber surface, and the fraction can be determined, for example, based on the type, composition, and/or application of a particular fiber. Scoring a fiber, in embodiments, can additionally or, alternatively, comprise producing a score in the fiber surface having a particular depth, and the depth can be determined, for example, based on the type, composition, and/or application of a particular fiber.

For example, in an embodiment scoring blades can be positioned at a scoring position (e.g., relative to the center axis of a fiber), and/or positioned to apply a particular scoring force (e.g., a pressure) of one or more blades to the fiber surface, to score the fiber to a particular desired depth. A particular desired depth, and/or scoring force, can be based on, for example, the type, composition, and/or application of a particular fiber.

In an embodiment, to score the fiber surface a scoring assembly can be fixed (e.g., so as to not rotate) around a fiber, can rotate around the fiber or, alternatively, can be configured to rotate the fiber within it. Using the foregoing example of a scoring assembly having 3-blades equally located (e.g., angularly) around a fiber, positioning the blades to score the surface can produce three scores equally spaced scores in the fiber surface using a scoring assembly fixed around the fiber. Continuing this example, rotating the scoring assembly 60 degrees around the fiber (or, alternatively, rotating the fiber 60 degrees within the scoring assembly), with the blades positioned to score the fiber surface, can produce three equally-spaced scores, each comprising 60 angular degrees of the fiber surface.

Embodiments can rotate an actuator by a variety of means, such as (for example) a combination of axles, gears, drums, and/or other such mechanical means. In this example, an embodiment can rotate an actuator by means of electric or hydraulic motors, knobs, or computer-driven mechanisms. It would be apparent to one of ordinary skill in the art to select a means to rotate an actuator appropriate to the embodiment of a particular cleaver and/or scoring assembly.

As previously described, at 102 the cleaver rotating the actuator can position one or more blades to decrease the radial distance and/or to increase the scoring force. Rotating the actuator can increase (or, decrease) a positioning force applied to one or more blades. Further, in this example, the degree to which the blades are depressed, and/or the magnitude of a positioning force applied to a blade, can be proportional to the angular rotation of the actuator.

To illustrate, a rotating actuator can include one or more raised surfaces, such as cams, that contact a respective blade as the actuator is rotated. For example, a cam contacting a blade can decrease the radial distance of blade from the fiber surface, and/or increase a positioning force on the blade, in correspondence to (e.g., a linear correspondence to) the position on the cam surface in contact with the blade. Accordingly, the angle, and/or height, of the cam surface in contact with a blade can correspond to a radial distance of the blade from the fiber, a positioning force applied to a blade, and/or a scoring force applied to the fiber surface.

At 106 of method 100, the cleaver applies a cleaving force to the fiber to cause the fiber to cleave (e.g., break) cross-sectionally at the locations of the scores on the fiber surface. In embodiments, the cleaving force can be, for example, a tension applied longitudinally to the fiber. In another example, the cleaving force can be a torsional force that rotates, in opposing directions, the two portions of the fiber on either side of the scores. Applying a cleaving force, at 106, can, in embodiments, be performed simultaneously with or, alternatively, separate from, scoring the fiber at 104. At 108, the method has produced a cross-sectional cleaving of the fiber, the method is complete.

As previously described, in embodiments geometric properties of the score in the fiber surface can, at least in part, determine the quality of the cross-sectional face, or faces, of the cleaved fiber. Properties such as depth or width of the score, and/or angular position and/or length (as a fraction of the fiber circumference), of the score, can produce cross-sectional boundaries of the fiber that are of a particular quality. In embodiments, a scoring edge of a blade can have a shape (e, g., angular, dihedral, etc.) such that the deeper the scoring edge penetrates the fiber surface, the greater the width and/or length of the score produced by the blade.

In embodiments, decreasing the radial distance of a scoring edge from the center axis of the fiber can cause the scoring edge to penetrate deeper into the fiber surface. In embodiments, applying a force to a scoring edge, and/or decreasing the radial distance from the center axis of the fiber of a scoring edge, can additionally or, alternatively, increase the scoring force applied by the scoring edge to the fiber surface. Positioning a scoring blade to decrease the radial distance can, in embodiments, include applying a positioning force to the blade, and the positioning force can correspond to the scoring force applied by the scoring edge to the fiber surface.

Accordingly, such embodiments can, optionally, perform 110. In embodiments, 110 can be performed concurrent with, or separate from, scoring the fiber, at 104. At 110, an embodiment can determine if one or more blades of a cleaver are positioned to achieve a particular scoring force applied to a fiber, and/or a particular radial distance from the center axis of a fiber, to produce a pre-determined, or "target", amount of scoring force and/or target depth of a score. In embodiments, a target scoring force and/or score depth can correspond, for example, to a particular quality cleaving of a particular fiber type or composition.

To illustrate, continuing with the example of a rotating actuator, in an embodiment, at 110 the cleaver can determine if rotating the actuator has produced, for example, a particular target radial distance of a blade to the fiber surface, a particular target positioning force applied to the blade, and/or a particular scoring force applied to the fiber surface. Alternatively, at 110, the cleaver can determine if the actuator has rotated a particular angular distance corresponding to, for example, a particular target radial distance, positioning force, and/or scoring force. If so, at 104 the cleaver can discontinue rotating the actuator and score the fiber and, at 106, the cleaver can apply the cleaving force, such as previously described.

If, on the other hand, at 110, the cleaver determines that rotating the actuator has not produced a particular target radial distance, positioning force, and/or scoring force (and/or, alternatively, that the actuator has not rotated a corresponding angular distance), the cleaver can repeat 102. In an embodiment repeating 102 can comprise further rotating an actuator.

Embodiments can use varying mechanisms to determine, at 110, that the cleaver has achieved a particular target radial distance, positioning force, and/or scoring force. For example, an embodiment can use mechanical stops, corresponding to a position of a blade (or, a position of an actuator), to determine, at 110, that a cleaver has produced a particular target radial distance, positioning force, and/or scoring force. In another example, an embodiment can use a sensor to measure a positioning force (e.g., a pressure) applied to a blade to determine, at 110, that a cleaver has reached a particular target radial distance, positioning force, and/or scoring force.

At 106, embodiments can, optionally, perform 112 and 114. At 112, the cleaver determines if the cleaving force applied at 106 corresponds to a target force. In embodiments, the target force can correspond, for example, to the particular type and/or composition of the fiber, and/or the geometry (depth, width, and/or circumferential extent) of the score produced at 104. An embodiment can determine, at 112, if the cleaving force equals a target force using, for example a force sensor. For example, but not intended to be limiting to embodiments, to produce a cleaving force, an embodiment can apply a tension longitudinally to the fiber. In this example, the cleaver can include a tension sensor and, based on the tension measured by the tension sensor, can determine, at 112, if the cleaving force is equal to a target force.

If, at 112, the cleaver determines that the cleaving force equals a target force, at 108 the method is complete. Alternatively, if the cleaver determines, at 112, that the cleaving force does not equal the target force, the cleaver can increase the cleaving force. Continuing the example of applying a tensioning cleaving force, at 114 the cleaver can increase the longitudinal tension applied to the fiber. In this example a cleaver can include, for example, a screw or gear, to adjust a mount holding the fiber, to increase (or, alternatively, decrease) the tension on the fiber. An embodiment can increase the cleaving force at 114 and repeat 112, to determine if the increased force equals the target force.

An apparatus, or a device, can embody aspects of the disclosure. For example, as described in reference to method 100, a scoring assembly can be included in a cleaver, and can embody aspects of the disclosure.

Figure 2A:
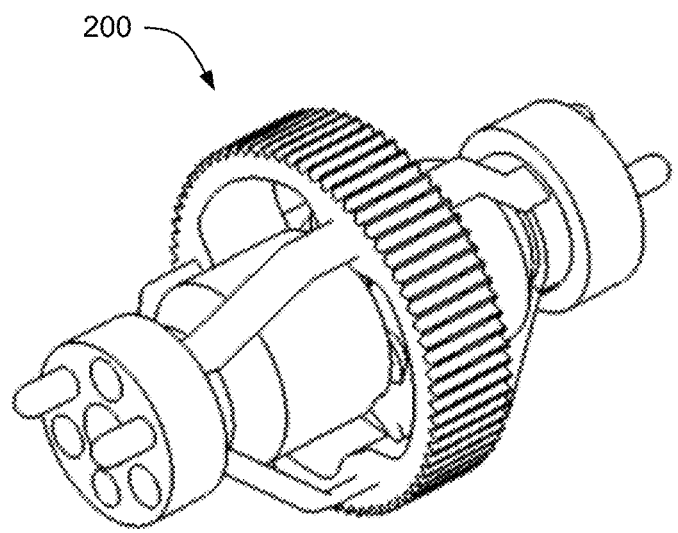
FIG. 2A is a block diagram illustrating an example scoring assembly, according to aspects of the disclosure.
Figure 2B:
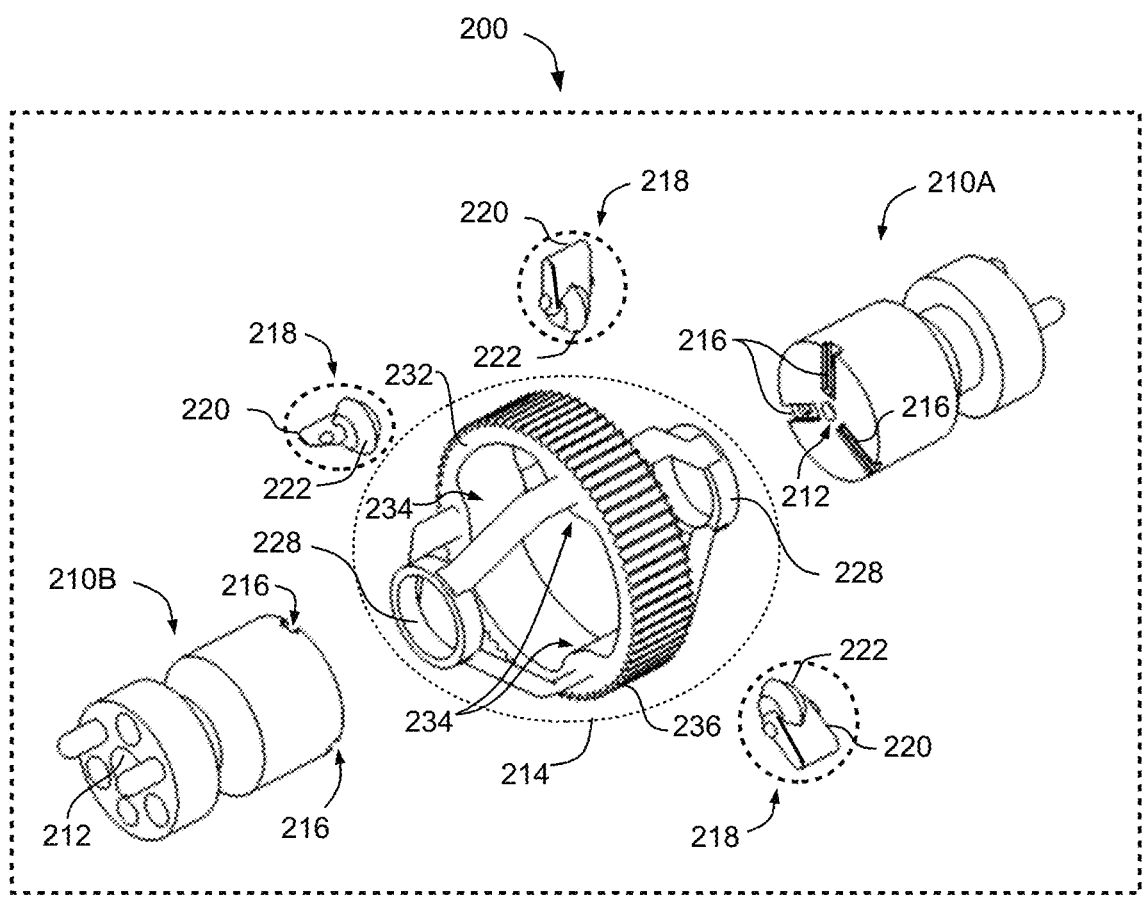
FIG. 2B is a block diagram illustrating details of the example scoring assembly of FIG. 2A, according to aspects of the disclosure.

FIG. 2A illustrates scoring assembly 200 in an assembled form, while FIG. 2B is an exploded view of the elements comprising scoring assembly 200 of FIG. 2A. As shown in FIG. 2B, scoring assembly 200 comprises actuator 214 and blade holders 210A and 210B. It can be seen from FIG. 2A and 2B that blade holders 210A and 210B can mate within actuator 214 to form a singular (mated) blade holder (hereinafter, "blade holder 210", not shown separately) that can contain scoring blades. Blade holders 210A and 210B each comprise respective fiber guides 212 and respective blade slots 216. Fiber guides 212 can operate, for example, to guide a fiber for longitudinal placement within scoring assembly 200.

Scoring blades 218 each comprise a respective blade guide, 220, and scoring edge, 222. In embodiments, a scoring edge, such as 222, can be capable of penetrating, or cutting, the surface of a fiber to score the fiber surface. In this example, scoring edge 220 is shown as a circular scoring edge; however, this is not intended to limit embodiments, and embodiments can employ a variety of scoring edge geometries, including, but not limited to, a lateral edge of blade guide 220 facing the surface of a fiber positioned within scoring assembly 200.

Blade guides 220 insert into respective, opposing blade slots 216 of blade holders 210A and 210B. When 210A and 210B are mated within actuator 214, blade guides 220 are inserted into respective blade slots 216 to position each of scoring blades 218 with their respective scoring edges 222 facing the surface of a fiber placed within scoring assembly 200. In embodiments, blade slots 216 can allow blade guides 220 to move radially, for example, closer to, and/or further from, the surface of the fiber. For example, a blade among 218 can be placed in an initial position, within opposing blade guides 216 of blade holder 210, such that a fiber can be inserted into scoring assembly 200 without the blade contacting (or, alternatively, without making scoring contact) with the fiber. The blade can be subsequently positioned (e.g., by an actuator, such as 214) within opposing blade guides 216 of holder 210 radially closer to the fiber, such as to score the fiber. Embodiments can position a blade, within a blade holder, perpendicular to the fiber surface (or, alternatively, to an axial center of the fiber) or, alternatively, can position the blade at an oblique angle to the fiber surface (or, alternatively, to an axial center of the fiber).

FIG. 2B further illustrates that, in an embodiment, mated blade holders, such as 210A and 21B forming blade holder 210, can be separable such that scoring blades, such as 218, can be removable and/or interchangeable. For example, in embodiments scoring edges of scoring blades can have different hardness, and/or geometries, corresponding to different types and/or compositions of fibers. In embodiments, segments of a blade holder, such as 210A and 210B, can be separated to change one type of blade (e.g., having one hardness) with another type of blade (e.g., having a different hardness), and the segments can be mated again within the blade holder, such as can be seen from FIG. 2B, to change scoring blades to utilize with different fibers.

In FIG. 2B, actuator 214 comprises actuator ring 232. As shown in FIG. 2B, gear surface 236 forms the outer surface of actuator ring 232 and raised-surface cams 234 are located on the inner surface of actuator ring 232. Actuator 214 further comprises collars 228 that can, in embodiments, facilitate rotating actuator 214 around the mated combination of blade holders 210A and 210B (i.e., blade holder 210). Embodiments can couple gear surface 236 to a drive gear, or gear assembly, for example, that can drive gear surface 236 to rotate actuator 214 around blade holder 210.

FIG. 2B further illustrates that, in an embodiment, cams of an actuator, such as cams 234, can have a sloped, and/or bell, shape directed towards the radial center of a scoring assembly (e.g., towards a fiber positioned through fiber guides 212 within scoring assembly 200). Rotating actuator 214 around blade holder 210 can bring cams 234 into contact with respective blade guides 220 within blade holder 210. As a cam among 234 contacts a blade guide, among blade guides 220, the cam can depress the respective blade among 218 (e.g., by applying a positioning force) towards a fiber placed within scoring assembly 200.

In scoring assembly 200, the amount a blade 218 is depressed by a cam 234 toward the surface of the fiber can vary according to the location on the surface of the cam at which the blade guide 220 of the blade contacts the cam. To illustrate, as actuator 214 rotates, the amount that a cam 234 depresses a blade 218 can increase (and/or decrease) as the respective blade guide 220 contacts points along the sloped, or raised, surface of the cam that are radially closer to the fiber surface, which can decrease (and/or increase) the radial distance of the respective blade edge 222 from the fiber surface.

In embodiments, increasing (and/or decreasing) the radial distance of a blade, such as 218, from a fiber surface can, correspondingly, increase (and/or decrease) the depth of a score that a respective blade edge, such as 222, produces in the fiber surface. Additionally, or alternatively, in embodiments, the location on the surface of a cam 234 at which the respective blade guide 220 contacts the cam can increase (and/or decrease) the positioning force applied to the respective blade 218. In embodiments, increasing (and/or decreasing) the positioning force applied to a blade, such as 218, can correspondingly increase (and/or decrease) the scoring force applied to a fiber surface, and/or increase (and/or decrease) the depth of a score that a blade edge, such as 222, produces in the fiber. As can be seen from FIG. 2B, in an embodiment the position at which a cam or, any alternative raised surface, (e.g., a "ramp") within a blade actuator, such as 214, contacts a blade guide, and, correspondingly, the amount the cam depresses the corresponding blade, and/or the amount of positioning force the cam applies to the corresponding blade, can correspond to the angular distance that an actuator, such as 234 rotates around a blade holder, such as 210.

As can be further seen from FIG. 2B, in an embodiment, placement of slots 216 equilaterally around the circumference of blade holder 210, and similar placement of cams 234 equilaterally around the inner surface of actuator ring 232, can cause all of blade guides 220, when fixed within blade holder 210, to make simultaneous contact with equivalent locations along the surface of a respective cam (or, alternative raised surface) among cams 234. Alternatively, in embodiments, placement of cams 234 other than equilaterally around the inner surface of actuator ring 232, rotating actuator 214 around blade holder 210 can place differing blade guides, among blade guides 220, when fixed within blade holder 210, in contact with differing cams, among cams 234 (or, alternative raised surfaces), and/or in contact at different locations along the surfaces of respective cams among cams 234. Also, while not illustrated in FIG. 2B, cams need not be uniform in size and/or shape, such that different cams (such as 234) can position (e.g., depress within blade holder 210) different blades (such as 218) at different radial distances from the surface of a fiber for the same degree of angular rotation of an actuator, such as 232.

Figure 3A:
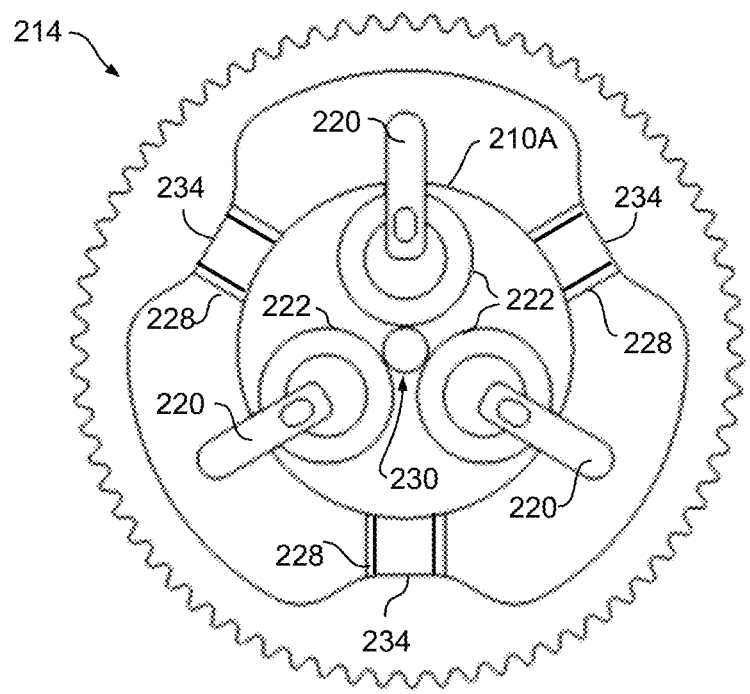
FIG. 3A is a sideview of a blade actuator, according to aspects of the disclosure.
Figure 3B:
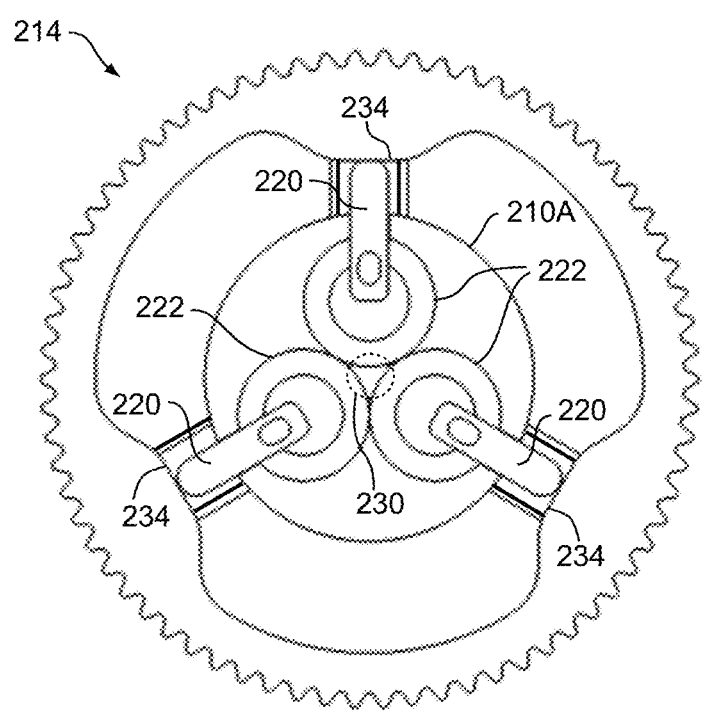
FIG. 3B is a second sideview of the blade actuator of FIG. 3A, according to aspects of the disclosure.

With reference to scoring assembly 200 of FIGS. 2A and 2B, FIGS. 3A and 3B depict side cut-away views of actuator 214 rotated around one half of blade holder 210. For purposes of illustrating the example, but not intending to limit embodiments, FIGS. 3A and 3B depict actuator 214 rotated around blade holder 210A and, while not shown, in the example of FIGS. 3A and 3B, blade holder 210B can be understood to be mated to blade holder 210A within scoring assembly 200, and to operate equivalently to 210A in the following description of FIGS. 3A and 3B.

FIG. 3A depicts actuator 214 rotated around blade holder 210A, such that in FIG. 3A, none of cams 234 are in contact with any of blades 220. As previously described in reference to FIG. 2B, collar 228 facilitates rotating actuator ring 214 around blade holder 210A. Accordingly, in FIG. 3A, blade guides 220 are in an initial position within blade holder 210A such that blade edges 222 make a non-scoring contact (or, not shown, no contact) with fiber 230 inserted into scoring assembly 200.

FIG. 3B depicts actuator 214 rotated such that all of cams 234 are in contact with all of blades 220. Accordingly, in FIG. 3B, blade guides 220 are in a scoring position within blade holder 210A such that blade edges 222 make a scoring contact with fiber 230. As shown in FIGS. 3A and 3B, cams 234 have a sloped (e.g., bell curve) shape and, in an embodiment, rotating blade actuator 214 can decrease the radial distance of one or more blade edges 222, to fiber 230 corresponding to the point at which a respective blade guide 220 contacts the surface of a cam among 234. Similarly, in an embodiment, rotating blade actuator 214 can increase a positioning force applied by one or more of cams 234 to a respective blade guide 220, as a blade guide 220 contacts different positions along the sloped shape of a cam 234. The radial position, and/or positioning force, applied to a scoring blade can have, for example, a linear correspondence between an angular distance the actuator rotates and the radial distance, and/or magnitude of the positioning force. In an embodiment, an angular distance the blade actuator rotates can additionally or, alternatively, correspond (e.g., linearly) to a magnitude of a scoring force applied by the scoring blade to the surface of a fiber.

Continuing with the foregoing example scoring assembly 200 of FIGS. 2A-3B, as previously described, in embodiments increasing (and/or decreasing) a positioning force applied to a blade (e.g., 218) can correspond to an increase (and/or decrease) in a scoring force applied by the blade to the surface of a fiber, and/or the depth, and/or geometry, of a score in the surface of a fiber produced the blade. In embodiments, a scoring assembly (e.g., 200) can include one or more sensors to sense the magnitude a positioning force applied to a respective blade (e.g., 218) when an actuator positions the blade (e.g., initially, and/or to produce a score) within the scoring assembly.

Figure 4A:
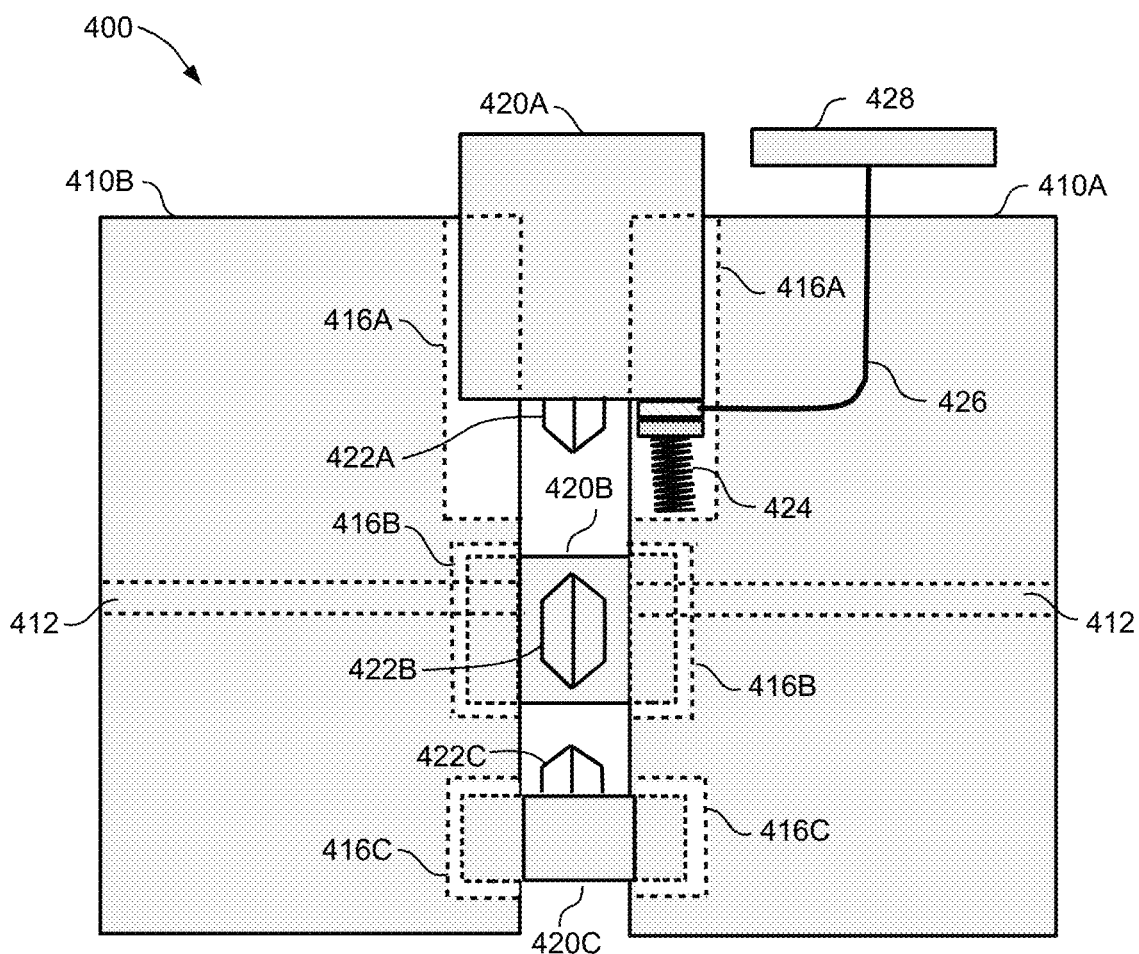
FIG. 4A is a block diagram illustrating a sensor included in a scoring assembly, according to aspects of the disclosure.
Figure 4B:
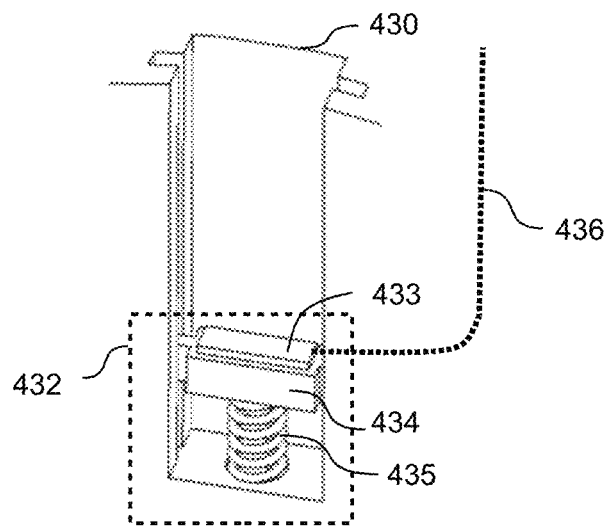
FIG. 4B is a block diagram illustrating details of the sensor of FIG. 4A, according to aspects of the disclosure.

FIGS. 4A and 4B illustrate an embodiment including a sensor included in scoring assembly, such as 200 of FIGS. 2A and 2B, to measure the magnitude of a positioning force applied by an actuator (e.g., 214) to a blade (e.g., 218) within the scoring assembly. FIG. 4A depicts a scoring sub-assembly, 400, which can be, in an embodiment, a component of a scoring assembly such as the example scoring assembly, 200, of FIGS. 2A and 2B. Sub-assembly 400 comprises blade holders 410A and 410B, shown in FIG. 4A mated together. In an embodiment, blade holders 410A and 410B can be similar to blade holders 210A and 210B of FIG. 2B, and blade guides 420A, 420B, and 420C (collectively, "blade guides 420") and scoring edges 422A, 422B, and 422C (collectively, "scoring edges 422"), of FIG. 4A, can be similar to blade guides 220 and scoring edges 222, respectively, of FIG. 2B.

FIG. 4A further depicts blade holders 410A and 410B each comprising equivalent, mating blade slots 416A, 416B, and 416C (collectively "blade slots" 416), and equivalent, mating fiber guides 412. In embodiments, blade slots 416A, 416B, and 416C (collectively, "blade slots 416") can be similar to blade slots 216 of FIG. 2B, and fiber guides 212 can be configured for inserting a fiber, similar to fiber guides 212 of FIG. 2B. Within the mated combination of blade holders 410A and 410B (hereinafter, "blade holder 410"), in an embodiment blade slots 416 can position blade guides 420 and scoring edges 422 radially closer to, and/or further from, a fiber inserted through fiber guides 412, similar to the foregoing example of scoring assembly 200 of FIGS. 2A and 2B. While not shown in FIG. 4A, in an embodiment an actuator (e.g., similar to 214 of FIG. 2B) can be configured to rotate around sub-assembly 400 (and/or, components of sub-assembly 400, such as blade guides 420) to position blade guides 420 and scoring edges 422 within blade guides 416.

FIG. 4A depicts sub-assembly 400 further comprising sensor 424 and sensor output device 428, connected to each other by interface 426. In embodiments, sensor 424 can measure a magnitude of a positioning force (for example, but not intended to limit embodiments, a pressure) applied to blade 420A (e.g., by a cam such as one of cams 234 of actuator 214 of FIGS. 3A and 3B). Sensor 424 can communicate (e.g., as an electronic signal, and/or a data communication) the magnitude to output device 428 using interface 426. Output device 428 can indicate (e.g., display), and/or communicate (e.g., to a processor and/or to a display) the magnitude of the positioning force received from sensor 424.

In an embodiment, the positioning force applied to sensor 424 can correspond to a scoring force applied by scoring edge 422A to a fiber within sub-assembly 400, and/or to a radial proximity of scoring edge 422A (or, alternatively, blade guide 420A) to a fiber within sub-assembly 400. While the foregoing example of FIGS. 4A and 4B illustrate using a sensor responsive to pressure applied to the sensor, it will be appreciated by one of ordinary skill in the art that, in embodiments, sensor 424 can be any type of sensing device, responsive to any type of force corresponding, for example, to a force on a scoring blade and/or a scoring force applied by a scoring blade to a fiber surface.

While FIG. 4A depicts blade slot 416A including sensor 424 connected by interface 426 to output device 428, it would be apparent to one of ordinary skill in the art to include, in an embodiment, a plurality of sensors, such as 424, and to associate each sensor with a respective blade and/or slot of a scoring assembly. It would be further apparent to one of ordinary skill in the art, in an embodiment, to include an associated interface, such as 426, with each of the plurality of sensors or, alternatively, to connect to a plurality of sensors to a single interface such as 426. Additionally, it would be apparent to one of ordinary skill in the art to include a plurality of interfaces, such as 428, and to connect each of the sensors to a corresponding interface among the plurality of interfaces, and/or to connect a plurality of interfaces to a single output device or, alternatively, to include a plurality of output devices, such as 428, and to connect each of a plurality of interfaces to a respective output device among the plurality of output devices.

FIG. 4B illustrates details of an example sensor (e.g., 424 of FIG. 4A) within a blade slot (e.g., 416A of FIG. 4A) of a scoring assembly (e.g., 200 of FIGS. 2A and 2B). In embodiments, blade slot 430 can be similar to one of example blade slots 416 of FIG. 4A, and includes sensor 432. In embodiments, sensor 432, of FIG. 3B, can measure, for example, a magnitude of a positioning force applied to a scoring blade (e.g., applied to a blade guide of a scoring blade). Sensor 432 connects to interface 436 and, as previously described, in an embodiment sensor 432 can communicate the measured magnitude of a force (e.g., a positioning force) to an output device using interface 436.

Sensor 432 is an example sensor, consistent with aspects of the disclosure, shown further comprising sensing device 433, spring 435, and mount 434. In embodiments, mount 434 and spring 435 can operate to oppose a force applied to sensing device 433 (e.g., by a blade guide, such as 420A of FIG. 4A). Sensing device 433 can, for example, operate to translate the force to an electronic output signal and/or data and can output the signal and/or data on interface 436. An output device (not shown in FIG. 4B), such as 428 of FIG.

4A, can receive the sensor output and can display and/or communicate the output such as previously described with reference to FIG. 4A.

Figure 5:
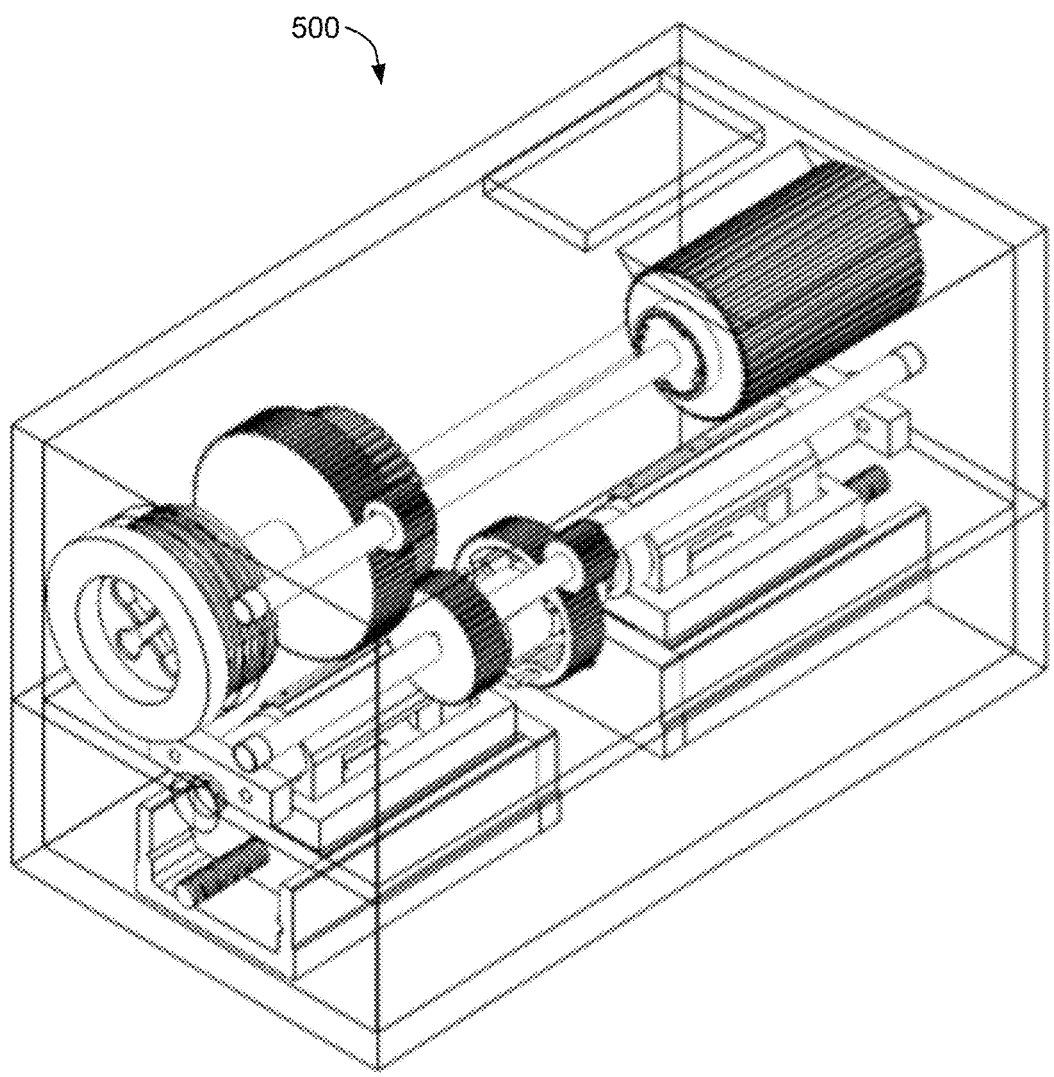
FIG. 5 is a block diagram illustrating an example cleaver, according to aspects of the disclosure.
Figure 6:
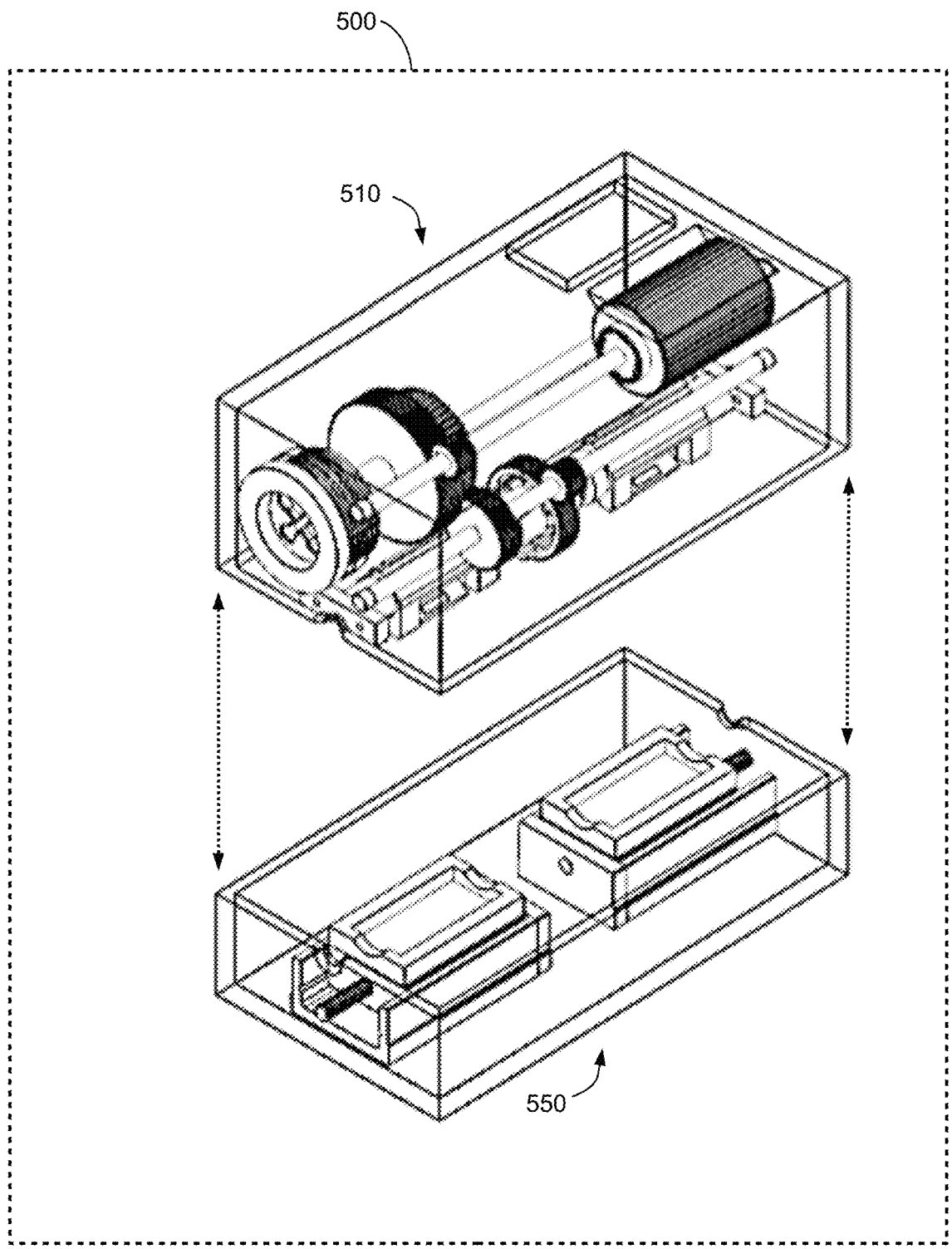
FIG. 6 a block diagram illustrating a top half and a bottom assembly of the cleaver of FIG. 5, according to aspects of the disclosure.
Figure 7:
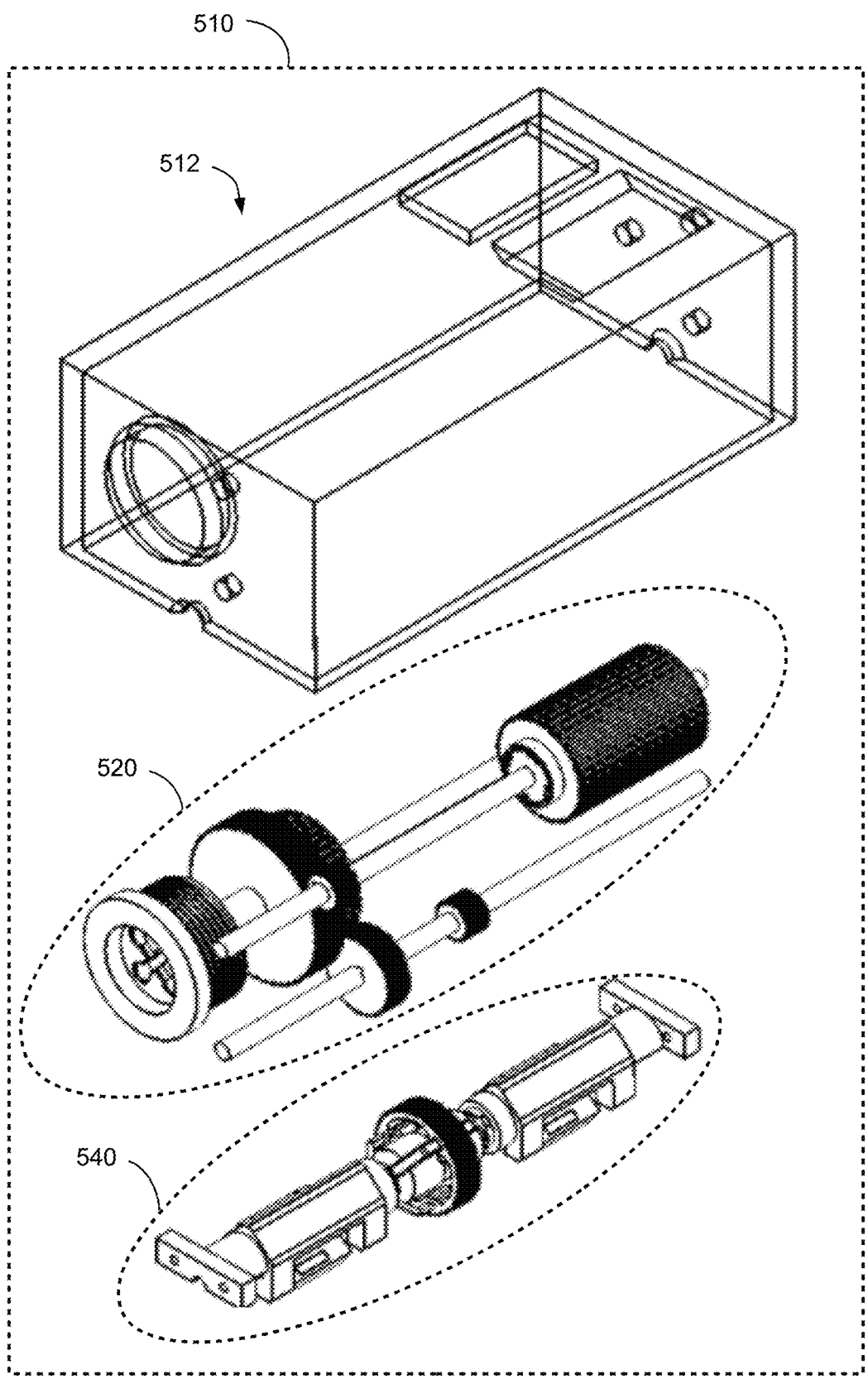
FIG. 7 is a block diagram illustrating details of the top assembly of FIG. 6, according to aspects of the disclosure.

As previously described in reference to FIGS. 1-4B, a cleaver can be an apparatus, or device, which can embody disclosure. FIGS. 5-11 illustrate an example embodiment of a cleaver, using the foregoing examples of FIGS. 2A-4B, according to the disclosure. FIG. 5 depicts example cleaver 500 in an assembled form. FIG. 6 illustrates a top assembly, 510, of cleaver 500 that can mate to a bottom assembly, 550. FIGS. 7-11 further illustrate details of the example top half, 510, bottom half, 550, assemblies of cleaver 500. FIG. 7 is an exploded view of top assembly 510, of FIG. 6, and shows 510 comprising top housing 512, drive assembly 520, and cleaving assembly 540.

Figure 8:
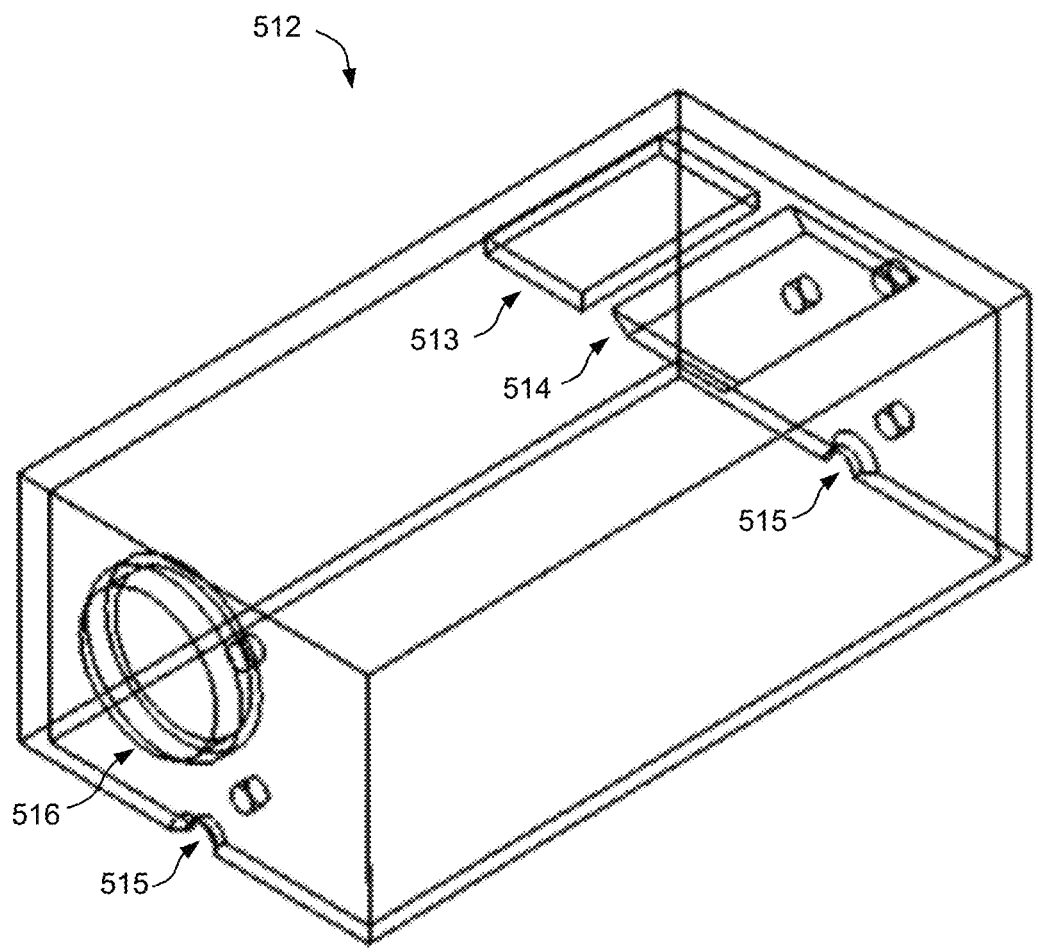
FIG. 8 is a block diagram illustrating a housing of the top assembly of FIG. 6, according to aspects of the disclosure.

FIG. 8 further illustrates top housing 512, of FIG. 7, comprising openings 513 and 514, and fiber guide slots 515. In embodiments, opening 513 can facilitate mounting an output device, such as a display (e.g., a digital display) and/or a processor, that can be coupled to an interface to receive, for example, an output of a sensor such as illustrated by 428, 426, and 424, of FIG. 4A.

Opening 514, in embodiments, can facilitate access to a drive assembly, such as 520 of FIG. 7. For example, one or more gears of a drive assembly, such as 520, can be exposed by means of opening 514 to a drive actuator that can mesh with the exposed gears to drive operate the drive assembly. Fiber guide slots 515 can, in embodiments, facilitate insertion of a fiber into a cleaving assembly, within cleaver 500, such as 540. Housing 512 is further shown, in FIG. 8, comprising opening 516. In embodiments, opening 516 can facilitate additional, or alternative, means (e.g., a drive knob) to operate a drive assembly, such as 520.

Figure 9:
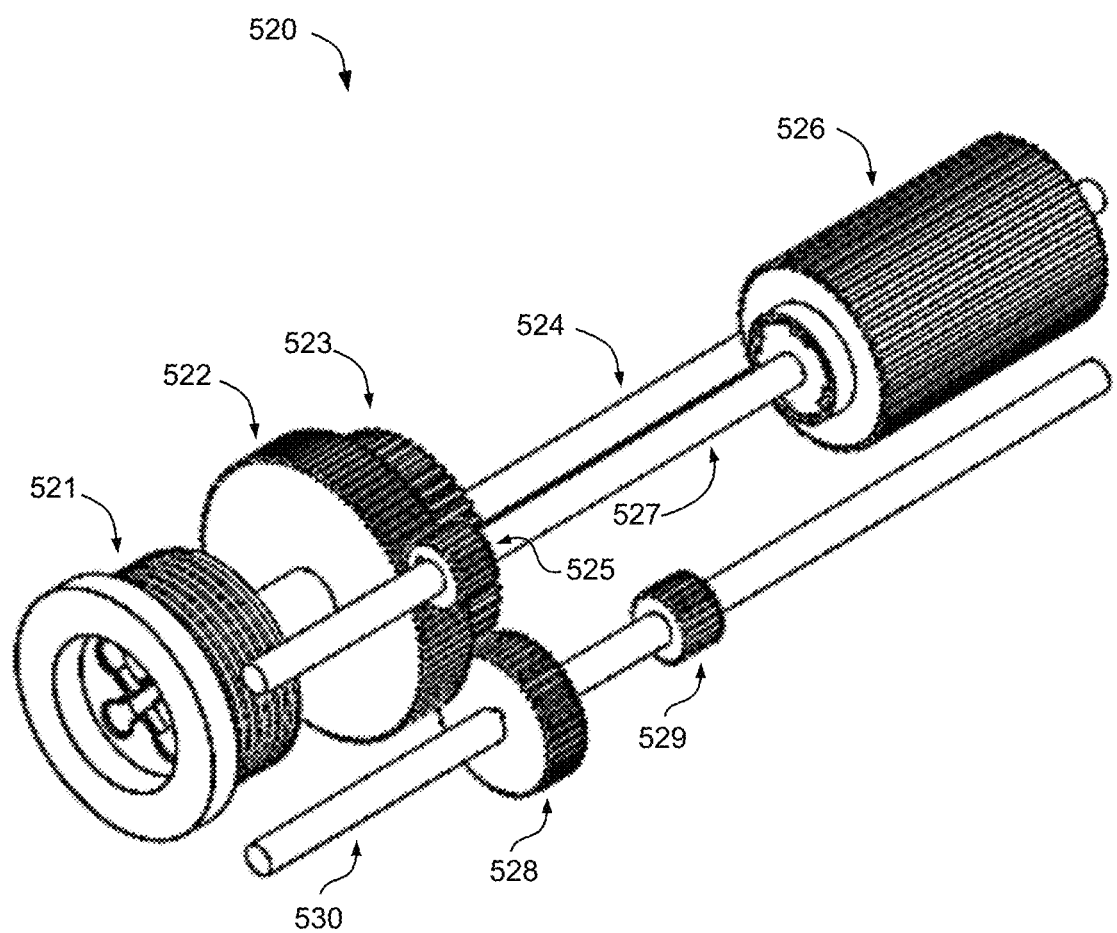
FIG. 9 is a block diagram illustrating a gear assembly of the top assembly of FIG. 6, according to aspects of the disclosure.

FIG. 9 illustrates example details of drive assembly 520. Drive assembly 520 is shown, in FIG. 9, comprising drive knob 521 and gears 522 and 523 fixed to axle 524; gears 525 and 526 fixed on axle 527; and, gears 528 and 529 fixed to axle 530. Gear 523 is shown, in FIG. 9, to mesh with gear 528 such that rotating axle 524 and gear 523 can, in turn, rotate gear 528. Rotating gear 528 can, in turn, rotate axle 530 and gear 529. In embodiments, gear 529 can be coupled to a scoring assembly, such as 200 of FIGS. 2A and 2B, to rotate an actuator ring, such as 214 of FIG. 2B.

In embodiments such as FIG. 9, either rotating drive knob 521 (as fixed to axle 524), or rotating gear 525 (as shown in FIG. 9, meshing with gear 522), can rotate gear 523 to, in turn, rotate gear 528, axel 530, and gear 529. Rotating drive knob 521, in embodiments, can be accomplished, for example, manually and/or by means of a motor or other mechanical or electric device coupled to drive knob 521. As previously described with reference to FIG. 6, in embodiments drive knob 521 can be accessed by means of opening 516 depicted in FIG. 8. Drive gear 526, in embodiments, can be coupled to a drive actuator, such as previously described with reference to FIG. 8, that can rotate gear 526 to, in turn, rotate axle 527 and gear 525. In embodiments a driver actuator can couple to gear 526 by means of an opening in a cleaver, such as opening 514 of cleaver 500 in FIG. 8.

Figure 10:
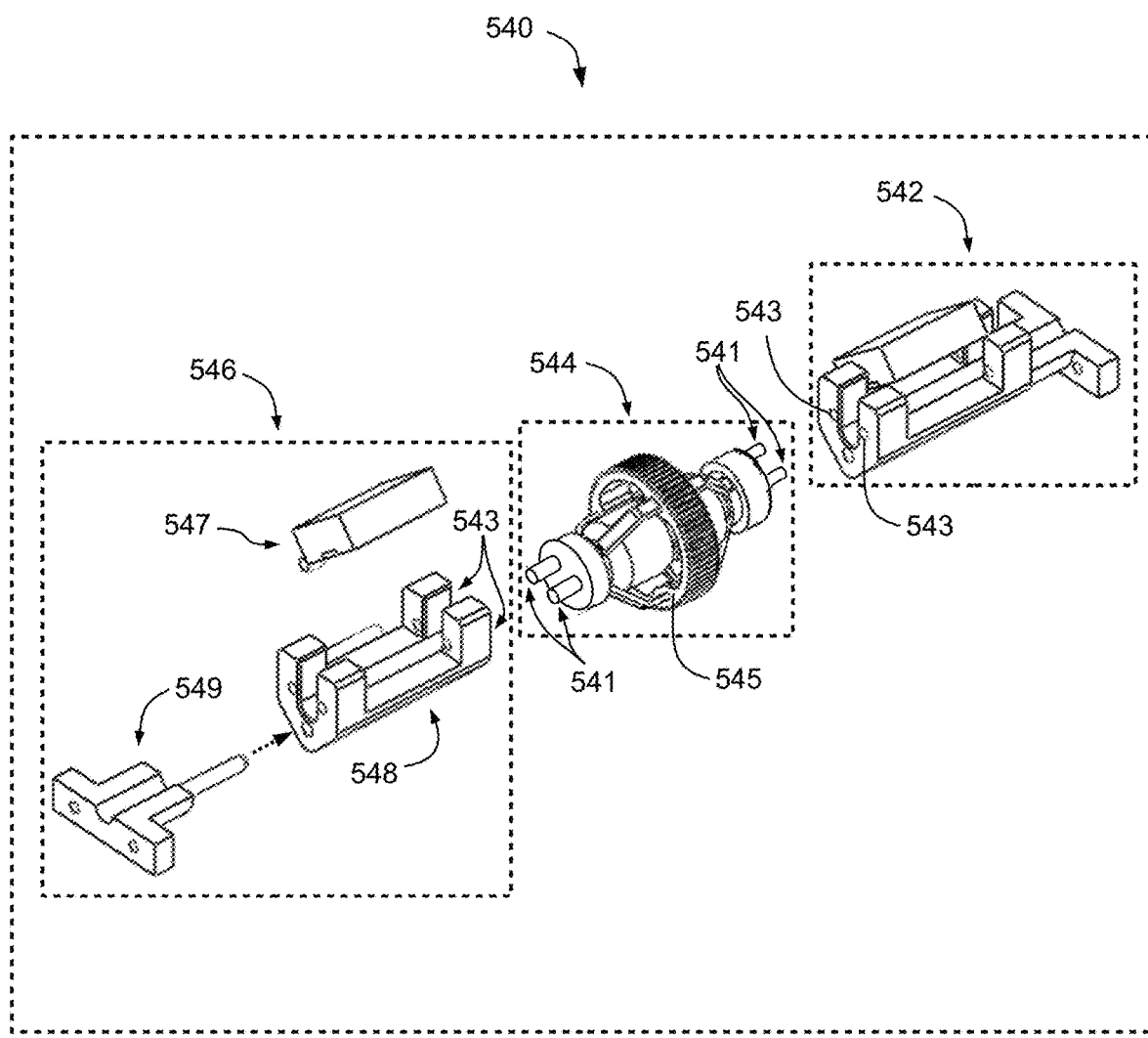
FIG. 10 is a block diagram illustrating details of a cleaving assembly of the top assembly of FIG. 6, according to aspects of the disclosure.

FIG. 10 illustrates example details of cleaving assembly 540 of FIG. 7. As shown in FIG. 10, cleaving assembly 540 comprises fiber mounts 542 and 546 and scoring assembly 544. In embodiments, scoring assembly 544 can be similar to the example scoring assembly, and/or components thereof, of FIGS. 2A-4B. For example, scoring assembly 544 includes actuator 545, which can, in embodiments, be similar to actuator 214 of FIGS. 2A-4B. Actuator 545 can comprise a gear surface similar to 236, of FIG. 2B, and the gear surface can mesh with a drive actuator, such as gear 529 of FIG. 9. In an embodiment, a drive actuator, such as gear 529, can rotate actuator 545 to position blades within scoring assembly 544, such as previously described in reference to FIGS. 2A-2B.

In FIG. 9, fiber mount 542 comprises structural components 547, 548, and 549. Components 548 and 547, together, can serve to secure one end of segment of a fiber within cleaving assembly 540. Component 549 can be attached to a top housing, such as 512 in FIGS. land 8, to guide the combination of 547 and 548 for movement, within cleaver 500, along the longitudinal axis of scoring assembly 544. Component 547 can rotate upward from 548 into an open position (illustrated in the configuration of 542) during insertion of a fiber, and can subsequently rotate downward, to a closed position (not shown), against 548 to secure a fiber. In embodiments, and as illustrated in FIG. 9, fiber mount 546, in FIG. 9, can have a structure and operation identical to 542.

It can be further seen in FIG. 10 that, in cleaving assembly 540, 546 and 542 can mate to scoring assembly 544 by means of pins 541, on opposing ends of scoring assembly 544, and respective mating holes 543, in ends of each of 546 and 542 facing scoring assembly 544. As will be described in reference to FIG. 11, in embodiments securing a fiber in fiber mounts 546 and/or 542 542 can, for example, prevent longitudinal movement of the fiber within cleaving assembly 540 and/or scoring assembly 544, and/or can facilitate application of a cleaving force, such as a tension, to the segment of the fiber between 542 and 546.

Figure 11:
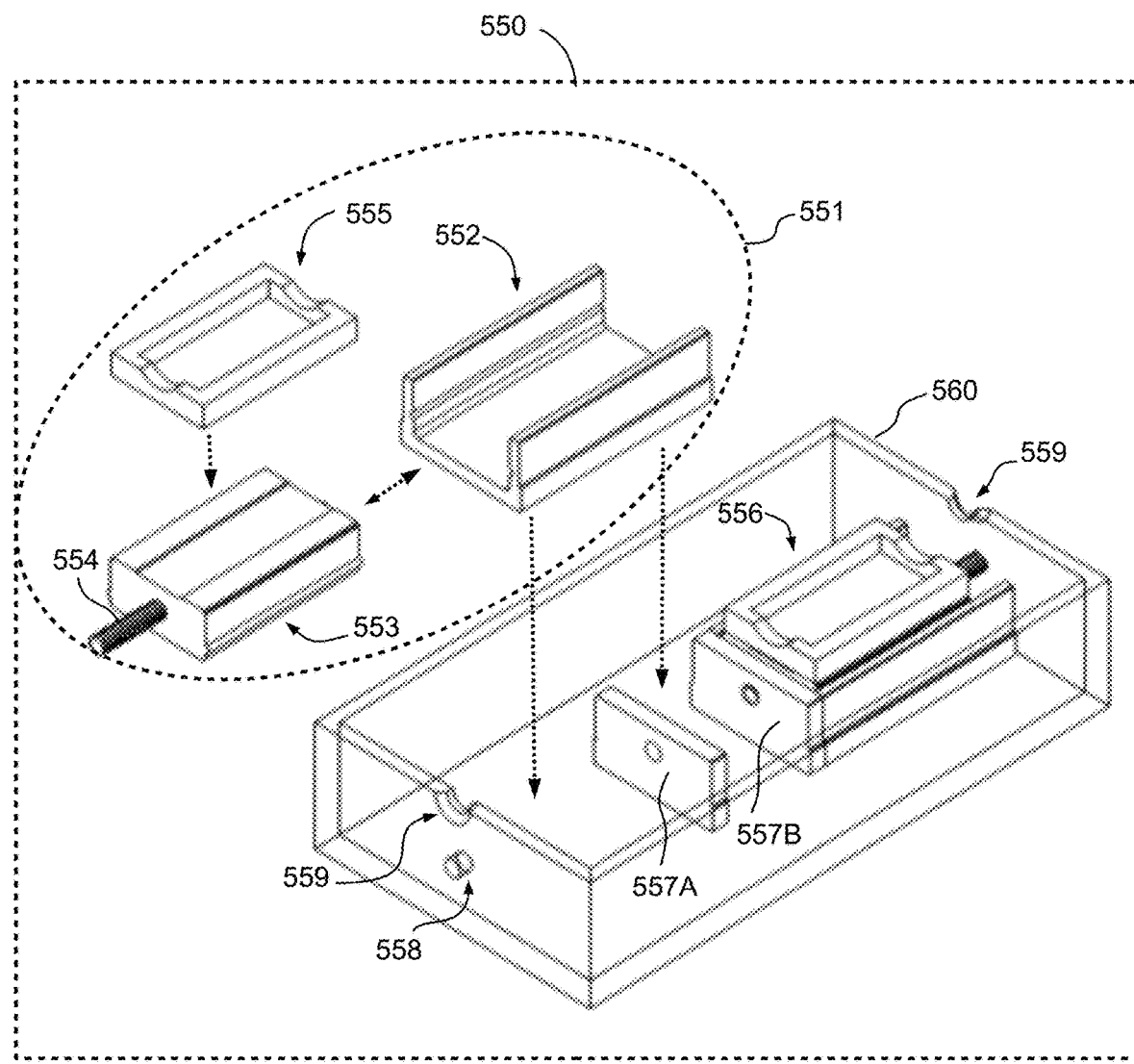
FIG. 11 is a block diagram illustrating details of the bottom assembly of FIG. 6, according to aspects of the disclosure.

FIG. 11 illustrates example details of the bottom assembly 550 of example cleaver 500 as depicted in FIG. 5. Bottom assembly 550 comprises housing 560, cleaving assembly mounts 551 and 556, mount plates 557A and 557B, and fiber insertion holes 559. FIG. 11. When bottom assembly 550 is mounted to top assembly 510, in the example of cleaver 500 in FIG. 6, fiber insertion holes 559 can mate to respective holes 515 of top housing 512, of FIG. 8, to guide a fiber for insertion into cleaver 500.

For purpose of illustrating the example of bottom assembly 550, but not intended to limit embodiments, in FIG. 11 cleaving assembly mounts 551 and 556 are considered to be identical in structure and operation, as further illustrated by the detail of cleaving assembly mount 551. In embodiments, cleaving assembly mounts, such as 551 and 556, can serve to mount a cleaving assembly, such as 540 in FIG. 10. A "tensioning assembly", in an embodiment, can comprise cleaving assembly mounts 551 and 556, of FIG. 11, in combination with fiber mounts 542 and 546 of cleaving assembly 540 of FIG. 10.

As shown in FIG. 11, cleaving assembly mount 551 comprises slider tray 552, mounting bracket 555 and slider 553. In embodiments, cleaving assembly mount 551 can attach to housing 560 by means of attaching slider tray 552 to mount plate 557A, similar to the manner FIG. 11 depicts cleaving assembly mount 556 attached to mount plate 557B. Mounting bracket 555 can be affixed to the top of slider 553, as indicated in FIG. 11, and the combination of 555 and 553, can insert into slider tray 552 and can be movable longitudinally (toward or away from cleaving assembly mount 551) within slider tray 552.

Slider 553 further includes tensioning screw 554. With cleaving assembly mount 551 attached to mount plate 557A, as previously described, tensioning screw 554 can extend through tensioning screw hole 558 in housing 560, to be accessible external to housing 560. Tensioning screw 554 can, in embodiments, function to move slider tray 553 closer or further from mount plate 557A. Similarly, cleaving assembly 556, as identical to cleaving assembly 561, can have a tensioning screw that can function to move a slider tray, included in 556, closer or further from mount plate 557B.

In embodiments, adjusting a tensioning screw, such as 554, can move a corresponding fiber mount, such as 542 of FIG. 10, attached to cleaving assembly mount 551 and/or 556. Moving a fiber mount attached to cleaving assembly mounts 551 and/or 556 can correspondingly apply (or, alternatively, relax) a tension to one or both ends of segment of a fiber inserted into a cleaving assembly, such as 540 in FIG. 10, that includes the fiber secured by the attached fiber mounts. As previously described, applying a tension to a segment of a fiber inserted into a cleaving assembly can, in embodiments, cleave the fiber at the location(s) of one or more scores created in the fiber, such as by a scoring assembly in the examples of FIGS. 2A-4B.

Using the foregoing examples of FIGS. 2A-11, but not intended to limit embodiments, in an embodiment a cleaver can comprise the components of example cleaver 500, which in turn can be implemented according to the examples of FIGS. 2A-4B. For example, scoring assembly 544 in FIG. 10 can be similar or, identical, to scoring assembly 200 in FIG. 2A and 2B. A gear assembly, such as 520 of FIGS. 7 and 9, can be driven by a drive knob, such as 521 and/or a drive gear, such as 526, in FIG. 9, to rotate an actuator such as 214 of FIG. 2B. Rotating the actuator can position one or more blades of the scoring assembly to produce one or more scores in the surface of a fiber inserted into the scoring assembly of the cleaver (e.g., into scoring assembly 540 of cleaver 500 through guide holes in the cleaver housing, such as the mated combination of guide holes 515 in top assembly 512 and 559 of bottom assembly 550 in FIGS. 8 and 11, respectively).

A cleaver can apply a tension to the fiber by means of, for example, a tensioning screw, such as 554, to longitudinally (i.e., along a longitudinal axis of the fiber) move a cleaving mount, such as 551 and/or 556. Moving the cleaving mount(s) can in turn longitudinally move fiber mounts, such as 546 and 542 of FIG. 10, coupled to (e.g., mounted in a mounting bracket, such as 555 in FIG. 11) the cleaving mounts, and moving the fiber mount can apply a tensile cleaving force to a fiber secured in the fiber mount.

As previously described, applying a tensile force to a fiber secured in the fiber mount can cause the fiber to cleave at the location(s) of one or more scores produced by, for example, rotating the actuator of a scoring assembly. In embodiments, the tension can be applied (e.g., increased) linearly until the tension causes the fiber to cleave. Scoring a fiber using a plurality of scoring blades, positioned axially around a fiber, and linearly increasing a tension applied to a fiber, in an embodiment, can produce a high quality cross-sectional face in the fiber.

In embodiments, also as previously described, rotating the actuator can comprise rotating a gear assembly by means of a drive knob (which can be manually rotated or, alternatively, rotated by mechanical means, such as a motor), and/or rotating a gear assembly by means of rotating a drive gear. Rotating the actuator, in embodiments, can further comprise positioning scoring blades of a scoring assembly by means, for example, of cams on an inner surface of an actuator, such as previously described in reference to FIGS. 2A-4B.

Additionally, as previously described in reference to FIGS. 4A and 4B, a cleaver can include a sensor to measure an amount of force applied to a scoring blade, and the sensor can signal or communicate the measured force to an output device, such as a display and/or a processor. The measured force can correspond to a depth of a score in the surface of the fiber, and/or a scoring force applied to the fiber surface, and a preferred angular rotation of the actuator can be determined in response to the measured force. For example, a human operator of a cleaver can determine how far to rotate a drive knob (e.g., 521 of FIG. 9) to produce a particular depth of a score, for example, in response to a measured positioning force indicated in a display (e.g., 428 of FIG>4A) connected to the sensor (e.g., 424 of FIG. 4A). In another example, a processor can be coupled to an assembly that can rotate the actuator by means of a drive gear of a drive assembly (e.g., 526, in FIG. 9) coupled to the actuator, and the processor can receive a signal and/or communication from the sensor to determine, for example, an angular distance to rotate the drive gear, corresponding to an angular distance to rotate the actuator to achieve a preferred depth of a score.

While not shown in FIG. 11, embodiments can similarly include a sensor to measure a cleaving force, which can in turn be used to determine a preferred cleaving force to apply to a fiber. Continuing with the example of cleaver 500, cleaver 500 can include a tension sensor coupled to, for example, one or both of cleaving assembly mounts 551 and 556 of FIG. 11. The tension sensor can measure a magnitude of the tensile force applied to the cleaving assembly mounts, and that tensile force can correspond to a tensile force applied to a fiber secured in the cleaving assembly coupled to the cleaving mounts.

Embodiments can couple (e.g., by means of an interface) the tension sensor to an output device, and the tension sensor can signal and/or communicate the magnitude of the tensile force to the output device. In embodiments, a cleaver (or, alternatively an operator of a cleaver) can use the measured tensile force output from the sensor, for example, to control the tensile force applied to a fiber during a cleaving process. For example, in an embodiment the output device can be a visual display, and a human operator of a cleaver can increase or, alternatively, decrease the tensile force in response to the magnitude displayed. In another example embodiment, the output device can include a processor, and the processor can respond to the magnitude of the tensile force output from the sensor. For example, a processor can increase or, alternatively, decrease the tensile force, in response to the output of the tension sensor, by means of a coupling to a tensioning screw.

The flowchart and block diagrams in the Figures illustrate the architecture, functionality, and operation of possible implementations of systems and methods according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and/or computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for cleaving a fiber, the method comprising:
   rotating an actuator ring around a scoring assembly to produce a score in a fiber, the fiber positioned within the scoring assembly, the scoring assembly comprising the actuator ring and at least one scoring blade, the actuator ring having an inner surface comprising a first cam, the first cam having a sloped surface, the rotating the actuator ring around the scoring assembly placing the sloped surface of the first cam in contact with a first scoring blade among the at least one scoring blade, the sloped surface of the first cam in contact with the first scoring blade applying a positioning force to the first scoring blade to produce the score in the fiber; and,
   applying a cleaving force to the fiber to cleave the fiber at a location of the fiber corresponding to the score.

2. The method of claim 1, wherein the rotating the actuator ring around the scoring assembly comprises rotating the actuator ring an angular distance around the scoring assembly to place the first cam in contact with the first scoring blade at a scoring position of the first scoring blade along the sloped surface of the first cam, the scoring position corresponding to at least one of a magnitude of a scoring force, applied by the first scoring blade to the fiber, to produce the score, and a radial distance of a scoring edge of the first scoring blade from a longitudinal axis of the fiber.

3. The method of claim 1, the method further comprising measuring, while rotating the actuator ring, a magnitude of the positioning force; and
   continuing the rotating the actuator ring, until the measured magnitude of the positioning force corresponds to a target magnitude of the positioning force.

4. The method of claim 3, wherein the target magnitude of the positioning force corresponds to a target depth of the score into the fiber.

5. The method of claim 1, wherein the at least one scoring blade comprises a plurality of scoring blades;
   wherein the inner surface of the actuator ring comprises a plurality of cams, the first cam among the plurality of cams, a second cam, among the plurality of cams, having a sloped surface; and
   wherein the rotating the actuator ring places the sloped surface of the second cam in contact with a second scoring blade, among the plurality of scoring blades, the contact of the sloped surface of the second cam with the second scoring blade applying a positioning force to the second scoring blade.

6. The method of claim 5, wherein two or more scoring blades, among the plurality of scoring blades,
   are mounted equidistant from each other, within the scoring assembly, around the surface of the fiber.

7. The method of claim 5, wherein the applying the positioning force to the respective scoring blade comprises applying a positioning force to a first respective scoring blade among the plurality of scoring blades equivalent to a positioning force applied to a second respective scoring blade among the plurality of scoring blades.

8. The method of claim 1, the method further comprising:
   measuring a magnitude of the cleaving force applied to the fiber; and
   increasing the magnitude of the cleaving force applied to the fiber until the magnitude of the cleaving force corresponds to a cleaving strength of the fiber.

9. The method of claim 1, wherein the applying the cleaving force comprises applying a tension to the fiber.

10. A cleaver, the cleaver comprising:
    a fiber cleaving assembly; a drive assembly; and, a scoring assembly,
    wherein the scoring assembly comprises a blade holder and an actuator ring;
    wherein the blade holder comprises a fiber guide and at least one scoring blade, the fiber guide located centrally within the blade holder, a first scoring blade, among the at least one scoring blade, movable, within the blade holder, toward the fiber guide;
    wherein the actuator ring is rotatable around the blade holder, the actuator ring having an outer gear surface and an inner surface comprising a first cam, the first cam having a sloped surface;
    wherein the drive assembly comprises a drive gear, the drive gear mounted within the cleaver to mesh with the outer gear surface of the actuator ring such that rotating the drive gear rotates the actuator ring around the blade holder;
    wherein the drive gear rotating the actuator ring around the blade holder places the sloped surface of the first cam in contact with the first scoring blade, the contact applying a first positioning force to the first scoring blade, the first positioning force positioning the first scoring blade in contact with a fiber positioned within the fiber guide, the first scoring blade in contact with the fiber producing a score in the fiber;
    wherein the fiber cleaving assembly comprises a first and a second fiber mount, the first fiber mount coupled to a first end of the fiber and the second fiber mount coupled to a second end of the fiber, to position the fiber within the fiber guide; and,
    wherein a movable fiber mount, among the first and second fiber mounts, is movable, along a longitudinal axis of the fiber, to apply a tensile force to the fiber, the tensile force cleaving the fiber at the position of the score in the fiber.

11. The cleaver of claim 10, wherein the movable fiber mount includes a tensioning screw; and,
    wherein rotating the tensioning screw moves the movable fiber mount along the longitudinal axis of the fiber to apply the tensile force.

12. The cleaver of claim 10, wherein the at least one scoring blade comprises a plurality of scoring blades;
    wherein the inner surface of the actuator ring comprises a plurality of cams, the first cam and a second cam included in the plurality of cams, the second cam having a sloped surface; and,
    wherein the rotating the actuator ring places the sloped surface of the second cam in contact with a second scoring blade, among the plurality of scoring blades, the second cam in contact with the second scoring blade applying a second positioning force to the second scoring blade.

13. The cleaver of claim 10, wherein a magnitude of the first positioning force corresponds to a depth, into the surface of the fiber, of the score.

14. The cleaver of claim 10, wherein the scoring assembly further comprises a sensor responsive to a magnitude of the first positioning force; and,
    wherein the cleaver further comprises an interface to communicate, from the sensor to an output device, the magnitude of the first positioning force measured by the sensor.

15. The cleaver of claim 14, wherein the output device comprises at least one of a display and a processor.

16. The cleaver of claim 10, wherein the cleaver further comprises a sensor responsive to a magnitude of the tensile force; and,
    wherein the movable fiber mount is further movable along the longitudinal axis to increase the tensile force until the magnitude of the tensile force, measured by the sensor, corresponds to a cleaving strength of the fiber.

\* \* \* \* \*